No. 12,172. REISSUED NOV. 24, 1903.
W. J. ASHER.
STARCHING MACHINE.
APPLICATION FILED DEC. 4, 1902.
2 SHEETS—SHEET 1.
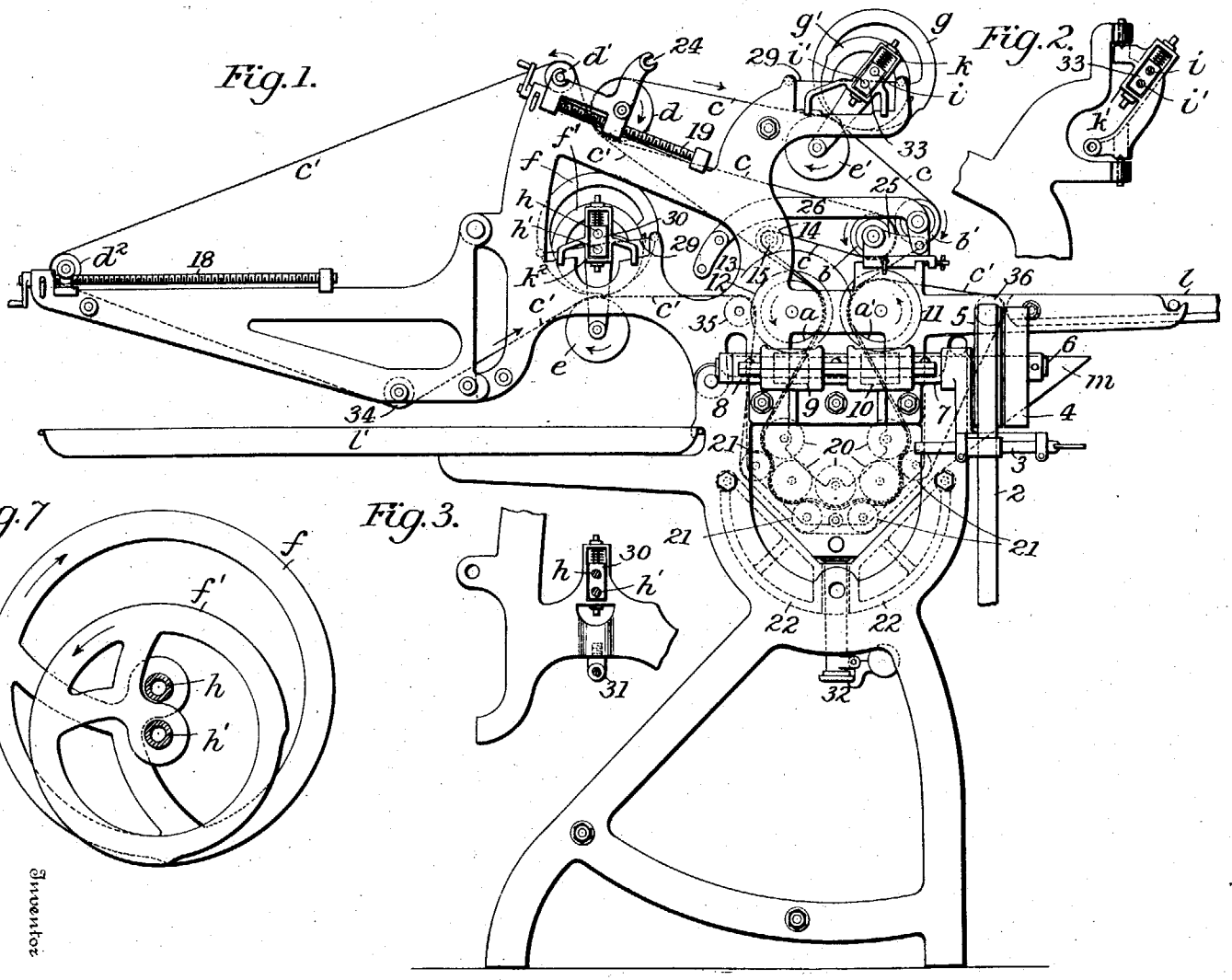
Witnesses
J. G. Stinkel
Thos. T. Gillman, Jr.
Inventor
William J. Asher
By
Foster Freeman
Attorneys No. 12,172. REISSUED NOV. 24, 1903.
W. J. ASHER.
STARCHING MACHINE.
APPLICATION FILED DEC. 4, 1902.
2 SHEETS—SHEET 2.
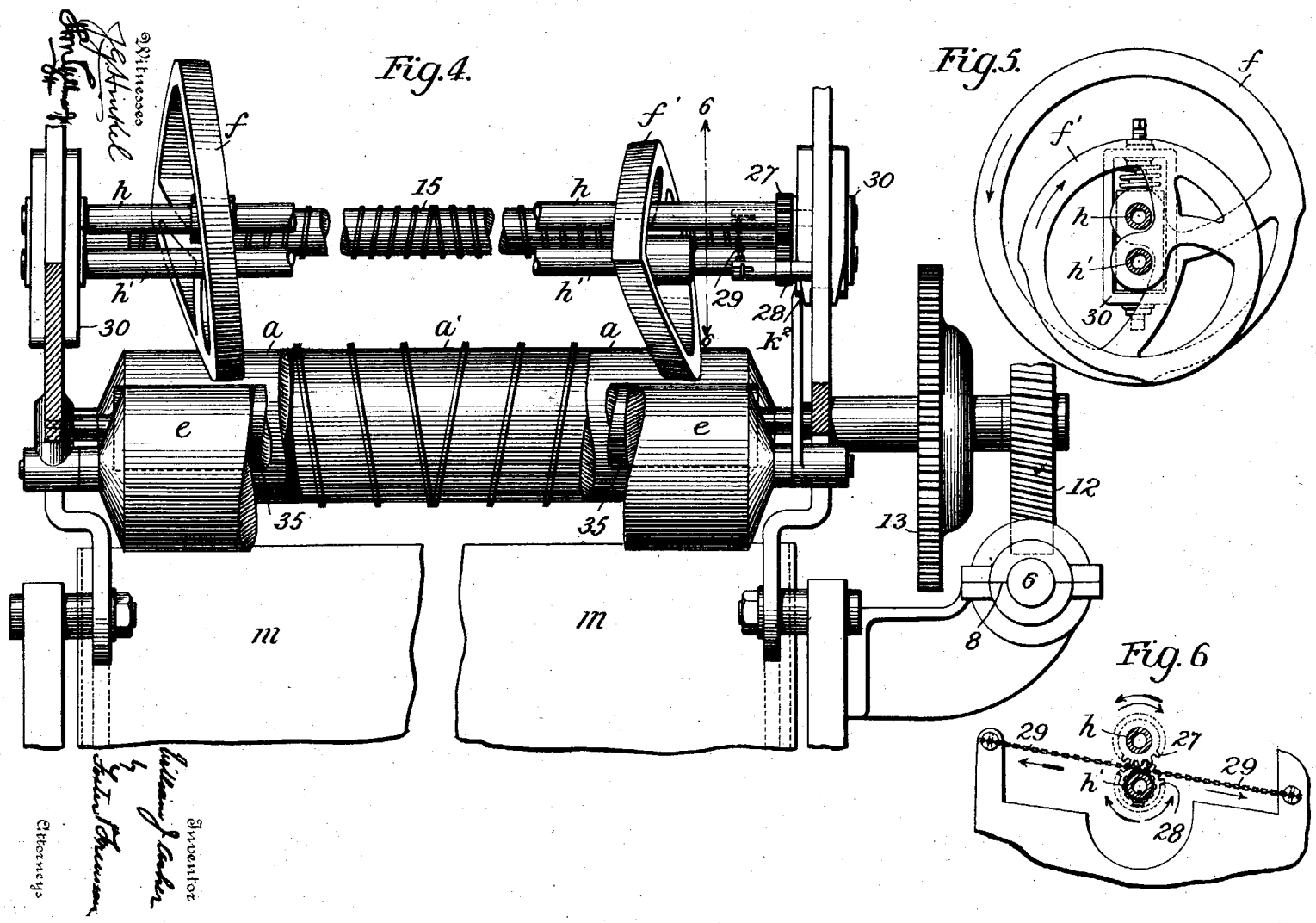

No. 12,172. Reissued November 24, 1903.

UNITED STATES PATENT OFFICE.

WILLIAM J. ASHER, OF WILLIMANTIC, CONNECTICUT.

STARCHING-MACHINE.

SPECIFICATION forming part of Reissued Letters Patent No. 12,172, dated November 24, 1903.

Original No. 680,559, dated August 13, 1901. Application for reissue filed December 4, 1902. Serial No. 133,845.

DIVISION A.

*To all whom it may concern:*

Be it known that I, WILLIAM J. ASHER, a citizen of the United States, residing at Willimantic, in the county of Windham and State of Connecticut, have invented certain new and useful Improvements in Starching-Machines, of which the following is a specification.

My invention relates to an improvement in starching-machines especially adapted to starching collars and cuffs. Difficulties of various kinds have heretofore been experienced in most machines of this class; and the object of my invention is to overcome these difficulties.

In carrying out my invention the collars, cuffs, or other goods are fed from a table upon the endless apron and between the same and another endless apron, which aprons pass over and between rollers and down through the vat or receptacle of hot starch mixture. As the aprons emerge from the vat they pass over a roller similar to the first roller and beyond which the aprons separate. At the point of separation I place a roller wound with wire spirally in opposite direction from the center. This roller preferably travels faster than the apron and acts to spread out evenly the upper apron. The upper apron then passes between rollers which remove from the apron by a squeezing operation the surplus starchy mixture. The apron then passes and meets the first apron, and the two pass the stretch-roller. At this meeting-point the upper apron, from which the starchy mixture has been squeezed, comes in contact with the surface of the collars, cuffs, or similar articles and removes, or, in other words, absorbs, from the surface thereof the surplus starchy mixture. At this roller the aprons again separate, the upper one passing forward and the lower one rearward. The stretch-roller is adjustable, so that a tension may be applied to the upper apron, and I employ another stretch-roller at the back end of the machine and over which the lower apron passes, which serves the additional purpose of allowing one of the rollers and the apron to be shifted, so that the collars and cuffs instead of passing to the rear of the machine to be removed by a second attendant may be caused to fall upon the upper apron and be carried forward to the attendant feeding the same into the machine.

It is necessary to guide both aprons as they pass through the machine, because they are liable to move to either one side or the other of the machine. To rectify this movement of the aprons, I provide guide-cams upon shafts in bearings and rollers over which the aprons pass, which rollers act together with the guide-cams. The guide-cams and their shafts are in bearings which at one side of the machine are pivoted, while the bearings at the other side of the machine have a motion in line with the frame of the machine. I employ one of these devices for each of the aprons, and they are located adjacent to where the aprons pass down into the vat of starchy material. The peculiar construction of these guide-cams and their operation are hereinafter more particularly described.

In the drawings, Figure 1 is a side elevation illustrating my improvement. Figs. 2 and 3 represent parts of the distant frame of the machine and the bearings of the guide-cams. Fig. 4 is an elevation and partial section, of exaggerated size, looking from the back of the machine forward, so as to show one set of guide-cams, their shafts, and the adjacent parts of the machine. Fig. 5 is an elevation of the two guide-cams shown in Fig. 4, their shafts being in section and the view showing the smaller cam first and the larger cam behind. Fig. 6 is a partial elevation and cross-section of the two shafts of the guide-cams, their gears, and adjacent parts on line 6 6, Fig. 4, looking toward the right-hand frame; and Fig. 7 is a view similar to Fig. 5, but with the guide-cams in the reverse position. In Figs. 5, 6, and 7 the parts are shown as of the same size as those in Fig. 4.

Power is communicated to the starching-machine by the belt 2 and the fast and loose pulleys 4 5 on the shaft 6, and the belt 2 is moved to stop and start the machine by the belt-shifter 3. The shaft 6 is in bearings 7 8 upon the frame of the machine, and the said shaft carries worm-wheels 9 10. These worm-wheels mesh with worm-gears 11 12. (Shown by dotted lines in Fig. 1.) These are on the ends of the shafts of the main roller $a\,a'$, and through the worm-wheels 9 10 and worm-gears 11 12 and the rollers $a$ $a'$ the aprons are driven and motion communicated to the other devices of the machine.

Upon the shaft of the roller $a$ is a spur-gear 13. (Shown by dotted lines, Fig. 1, and full lines, Fig. 4.) This gear meshes with a small spur-gear 14 on the shaft of the spreading-roller 15. The aprons $c$ $c'$ pass over a portion of the surface of the main rollers $a$ $a'$, and I prefer to make the surface of the rollers $a$ and $a'$ with spirally-arranged ribs, as shown in Fig. 4, as the same assists in evening the aprons.

In the sheet-metal vat $m$ is placed the hot starch material or mixture, and in the vat, supported by suitable frames, are series of rollers 20 21, between and around which pass the endless aprons $c$ $c'$. Adjacent to the lower portion of the vat $m$ I place a steam-jacket 22 for the purpose of keeping the mixture hot, and the lower end of the vat is provided with a discharge tube and valve 32, by means of which the contents of the vat can be removed.

The spreading-roller 15 is wound with wire spirally and closely in opposite directions from the center to the ends, and the same is caused to travel faster than the apron by the relative sizes of the spur-gears 13 14, and in this way the wet belt is spread out and evened as it passes around over the said roller 15. The rubber squeezing-rollers $b$ $b'$ are in suitable bearings upon adjustable bearing-boxes 25, capable of a certain extent of movement by means of a screw, (shown in Fig. 1,) and the bearings of the roller $b'$ are in levers 26, pivoted to the bearing-boxes 25, (shown in Fig. 1,) to the free ends of which levers some form of a weight device is preferably connected, the action of the levers being to press the squeezing-rollers tightly together for the purpose of removing any surplus of starchy material from the upper apron $c$ as the same passes between the said squeezing-rollers. The starchy material so removed falls upon the back of the apron $c$ as the same descends into the vat.

The stretch-rollers $d$ $d'$ have bearings in movable frames, the said frames being connected to the screws 19, which screws may be turned by handles to feed the same frames nearer to or farther from one end of the machine. The bearings of the stretch-roller $d$ are fixed in the frames; but the bearings of the stretch-roller $d'$ are in the form of jaws into which the ends of the shaft of the roller are received. The apron $c$ passes from the rubber rollers $b$ $b'$ to and around the stretch-roller $d$, while the apron $c'$ passes from the main roller $a$ to and under the surface of the roller $d$ and then over the surface of the roller $d'$ and away to the rear of the machine over the stretch-roller $d^2$. This stretch-roller $d^2$ is also in movable bearings operated by handles and screws 18. The special function of the roller $d^2$ is to stretch the apron $c'$, the apron $c$ being stretched by the stretch-roller $d$ and adjusted at the bearing-boxes 25 of the squeezing-rollers.

The stretch-roller $d^2$ may be moved considerably nearer to the machine, so as to slacken up the apron $c'$ sufficiently for the roller $d'$ to be lifted out of its bearing-jaws and placed in the jaws 24, which are in a plane forward of the bearings of the stretch-roller $d$.

Each of the devices employed by me to return either one or both of the endless aprons into the proper path consists of rollers and guide-cams. $e$ $e'$ represent the rollers, $f$ $f'$ one pair of guide-cams, and $g$ $g'$ the other pair of guide-cams. The guide-cams $f$ $f'$ are upon shafts $h$ $h'$, and the guide-cams $g$ $g'$ are upon shafts $i$ $i'$. The respective ends of the shafts are received in bearing-boxes in suitable frames held in place by the action of springs.

The shafts $h$ $h'$ have bearing-blocks 30 at their respective ends, and the shafts $i$ $i'$ have bearing-blocks 33 at their respective ends. One bearing-block 30 (see Fig. 3) is pivotally secured in an opening in the frame of the machine, while the other bearing-block 30 is in a frame $k^2$, which frame is provided with a downwardly-extending portion carrying one end of the roller $e$, while the other end of the roller $e$ is carried in a pivot 31. (See Fig. 3.)

The bearing-block 33 at one end of the shafts $i$ $i'$ is pivotally held in a frame $k'$, which frame $k'$ is connected to a bracket portion of the main frame (see Fig. 2) by pivot-points, upon which the same may swing, and the lower end of the frame $k'$ has a bearing for one end of the roller $e'$. The bearing-block 33 at the other end of the shafts $i$ $i'$ is pivotally held in a frame $k$, which frame has a downward-extending portion forming a bearing for the other end of the roller $e'$.

Each of the frames $k$ $k^2$ is made with outwardly-extending arms having forked ends, which ends rest upon and straddle portions of the frame. The shafts $h$ $h'$ and $i$ $i'$ are connected together by gears 27 28, and chains 29, passing around the shafts $h'$ and $i'$, have their respective ends rigidly fastened to the frame of the machine. The frames $k$ and $k^2$ are supported at the arms, which arms are forked and rest upon the frame of the machine. The function of the chains 29 and gears 27 and 28 will be hereinafter more fully described.

In the operation of the machine the collars, cuffs, and similar articles to be starched are placed upon a feed-table 1 and are fed by an attendant between the aprons $c$ $c'$, where they come together adjacent to the feed-table and pass over the main roller $a'$. The said articles are then carried between the two aprons down into the vat of hot starch mixture and between the series of rollers 20 21 in a tortuous direction, and in transit the starch is thus worked through the aprons into the collars and cuffs, and as the aprons pass out of the vat they pass over the roller $a$ and separate at the spreading-roller 15, the action of which, as hereinbefore described, is to smooth out the upper apron as the same passes over said roller 15. The goods starched continue upon the apron $c'$ toward the stretch-roller $d$, and the apron $c$ passes forward around the roller $b$ and between the same and the roller $b'$, which rollers squeeze the starch from the apron $c$, and the surplus falls upon the back of the same apron, passing in the opposite direction around the rollers $b'$ and $a'$ down into the vat. The arrows indicate the direction of movement of the aprons and the various rollers, and after the apron passes around the roller $b$ it passes rearward toward the stretch-roller $d$ and there meeting the starched goods absorbs from them the surplus starch as the goods and the two aprons pass beneath the roller $d$. The apron $c$ passes around the roller $d$ and again forward over the roller $e'$ to the roller $b'$, and so again down into the vat. The apron $c'$ continues upward over the roller $d'$ and rearward down to the roller $d^2$, carrying the starched goods upon its surface and delivering the same to be removed at the roller $d^2$ by an attendant. From the roller $d^2$ the apron passes around a roller 34 and up over the roller $e$, and at this point beneath the apron a drip-pan $l'$ is provided for receiving any surplus starch that may fall from the surface of the apron $c'$. The apron $c'$ then passes to and around a roller 35 adjacent to the main roller $a$, and so downward into the vat, around the series of rollers 21, and up adjacent to the feed-table, and over the roller 36, and thence to and around the main roller $a'$ to complete the operations. The functions of the squeezing-rollers $b$ $b'$ and the spreading-roller 15 have been hereinbefore described, as well as the fact that each of the main rollers $a$ and $a'$ has a spirally-wound surface in opposite directions and performs the function of a spreading-roller. If it is desired to return the starched goods to the operator feeding the same into the machine, the screws 18 are rotated to slacken the apron $c'$ and bring the roller $d^2$ toward the rearward end of the machine. The roller $d'$ is then lifted out of its bearings and placed in the jaws 24, and the stretch-roller $d^2$ is then moved by the screws rearward of the machine until the proper tension is brought to bear upon the apron $c'$. In this position it will be seen that the starched goods do not continue upon the apron $c'$, but after passing around the roller $d$ continue forward upon the apron $c$ to be removed by the attendant who fed them into the machine.

It is to be remarked that the parts shown in Fig. 1 connected to the frame of the machine are duplicated upon the other side of the machine, except where specially specified to the contrary. In connection with the guide-cams and their shafts and bearings it will be noticed that these devices are similar, and a description of the parts specially shown in Fig. 4 will serve to describe the operation of both devices.

By reference to Figs. 4, 5, 6, and 7 it will be noticed that the shaft $h$ carries the guide-cam $f$ and passes through the cam $f'$ and that the shaft $h'$, which carries the cam $f'$, passes through the cam $f$ and that the cam $f'$ is smaller than the cam $f$ to an extent equal in the diameter of the cam to twice the distance between the centers of the shafts $h$ $h'$, and the peculiar construction of the cams will be noted particularly from Figs. 4 and 5, and in Fig. 5 it will be seen that these cams are not a complete circle, but that a portion of the periphery for about one-quarter the circumference is of slightly less radius than the rest of the cam. It will also be noticed that the shafts $h$ and $h'$ are connected by the gears 27 and 28 and that the chain 29, passing around the shaft $h'$, is connected thereto at a central point, with the ends of the chains fastened taut to portions of the frame of the machine; also, that the frame $k^2$ supports the block 30 at the right-hand end (looking from the rear of the machine) of the said shafts and that the frame $k^2$ at its lower end carries one bearing of the roller $e$ and is provided with arms forked at the ends to straddle portions of the frame that are inclined to a horizontal line. In the operation of this guiding device and for the purpose of illustration we will suppose that the apron $c'$ is running off to the left of Fig. 4 and strikes the guide-cam $f$, coming between the edge of the cam and the roller $e$. This will cause the cam to move with the apron and roller and to rotate its shaft $h$ and through the gears 27 and 28 to rotate the shaft $h'$ and the cam $f'$ in an opposite direction, and this rotation will tend to feed the apron toward the right-hand side of the machine, or toward the cam $f'$, because the guide-roller $e$ will thus be swung out of square with the machine. It will be noticed that should the cam $f$ turn in the direction of the arrow, Fig. 5, three-quarters of a revolution the reduced periphery will allow the apron to pass free, the parts at this time occupying the position shown in Fig. 7. Should the apron then come into contact with the cam $f'$, it will cause the same to rotate in the direction of the arrow, Fig. 7, turning its shaft and through the gears 27 and 28 the shaft $h$ and the guide-cam $f$. The first movement produced by the apron coming into contact with the guide-cam $f$ will, through the intervention of the gears and the chain 29, impart a swinging movement to the frame $k^2$ and the roller $e$, moving the end of the roller nearest the point of vision in Fig. 1 toward the rearward part of the machine, so that the roller $e$ will not be at right angles to the frame of the machine, but, swinging on the pivot 31, will occupy an angular position to the apron and frames of the machine, so as to feed the apron toward the opposite side of the machine in the direction of the guide-cam $f'$, and when the apron comes against the guide-cam $f'$ the conditions are reversed, so that the roller $e$ swings toward the front portion of the machine to again cause the apron to travel toward the guide-cam $f$, the frame $k^2$ meanwhile moving over the surface of the frame at the forked end of its arms. The apron-guide or roller $e'$, with the frame $k$, has a similar motion and the guide-cams $g$ $g'$ a similar action with their attendant parts, so that the apron $c$ is treated by these devices in the same manner as the apron $c'$ by the devices hereinbefore described. It is essential that the line of direction of the aprons be thus rectified.

In my improved machine I have aimed to provide devices for thoroughly starching the collars, cuffs, and similar articles and to treat and deliver the same in the most convenient manner and to provide devices operating automatically for the perfect and successful working of the various parts and functions of the machine.

Some of the features of invention disclosed herein have, in accordance with the requirement of the office, been embodied in a divisional application for reissue, filed the 8th day of June, 1903, Serial No. 160,664.

Having thus described my invention, what I claim is—

1. In a starching-machine, the combination with endless aprons receiving the goods and means for starching the same, of means for separating the path of the aprons and means for removing the surplus starch from one apron, and means for returning the said apron for it to take up the surplus starch from the collars, cuffs, or similar articles, substantially as set forth.

2. In a starching-machine, the combination with an endless apron, and a roll or series of rollers around which the same passes in starching the goods, of a roller 15 around which the apron passes, squeezing-rollers between which the apron is passed to remove therefrom the surplus starch, a roller $d$ under which the apron thereafter passes in contact with starched goods so that the apron removes from the starched goods the surplus starch, and means for supporting the starched goods while the said apron passes in contact therewith, substantially as set forth.

3. In a starching-machine, the combination with the endless apron, and the rollers mounted in bearings for conveying and delivering the starched goods to the rear of the machine, of devices forming a second set of bearings for one of the rollers whereby said roller may be shifted from one position to another to alter the relation of the apron for changing the direction of the travel of the starched goods at the pleasure of the operator, so that the said goods may be delivered either toward the rear or toward the front of the machine, substantially as set forth.

4. In a starching-machine, the combination with the endless apron, of the stretch-rollers $d$ $d^2$, and a movable roller $d'$, frames carrying the same and screws for adjusting the position of the said frames and rollers, and jaws 24 upon the adjustable frames of the roller $d'$ for receiving the shaft of the roller $d'$ so as to change the direction of travel of the starched goods, substantially as set forth.

5. The combination in a starching-machine with the endless apron, of the stretch-rollers $d$ $d^2$, and a movable roller $d'$, frames supporting the same and screws for moving the said frames and rollers to tighten and adjust the positions of the aprons, and jaws 24 upon the frames of the rollers $d$ $d'$ for receiving the shaft of the roller $d'$ in a position above the roller $d$ so as to divert the path of the starched goods to the front of the machine instead of to the rear, substantially as set forth.

6. In a machine, the combination with an endless apron, of the spreading and evening roller 15 having spiral ribs upon the surface thereof in opposite directions from the center and means for causing the said roller to travel at a different speed from that of the apron passing over the same, substantially as set forth.

7. In a starching-machine, the combination with the endless aprons and the vat for hot starch material, of a series of staggered spaced-apart rollers within the vat and out of contact with one another and between which the endless aprons pass, the main roller $a$ at the exit of the aprons and a main roller $a'$ at the inlet of the aprons, the said roller $a'$ having spiral ribs on the surface thereof in opposite directions from the center toward the ends, substantially as and for the purposes set forth.

8. In a starching-machine, the combination with an endless apron, of means for guiding the apron, means for removing the surplus starch therefrom, and means for guiding the said apron for it to take up surplus starch from the starched articles, substantially as set forth.

WILLIAM J. ASHER.

Witnesses:
F. L. FREEMAN,
H. M. GILLMAN, Jr.